United States Patent
Karthik et al.

(10) Patent No.: US 12,339,749 B2
(45) Date of Patent: *Jun. 24, 2025

(54) TIME VARIATION PROTECTION FOR SNAPSHOTS

(71) Applicant: Rubrik, Inc., Palo Alto, CA (US)

(72) Inventors: Vijay Karthik, Sunnyvale, CA (US); Stephen Charles O'Hara-Smith, Tralee (IE); Sandeep Majji, Vizianagaram (IN); Samyak Jain, Jaipur (IN); Aman Bansal, Jaipur (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,022

(22) Filed: Jan. 19, 2024

(65) Prior Publication Data
US 2024/0152431 A1 May 9, 2024

Related U.S. Application Data

(63) Continuation of application No. 17/739,927, filed on May 9, 2022, now Pat. No. 11,928,032.

(51) Int. Cl.
G06F 11/00 (2006.01)
G06F 11/14 (2006.01)

(52) U.S. Cl.
CPC ...... *G06F 11/1464* (2013.01); *G06F 11/1451* (2013.01); *G06F 11/1469* (2013.01); *G06F 2201/84* (2013.01)

(58) Field of Classification Search
CPC ............ G06F 11/1464; G06F 11/1451; G06F 11/14699; G06F 2201/84
USPC ...................................................... 714/6.3, 20
See application file for complete search history.

(56) References Cited

U.S. PATENT DOCUMENTS

| | | | |
|---|---|---|---|
| 10,061,657 B1* | 8/2018 | Chopra | G06F 11/1461 |
| 11,567,686 B2* | 1/2023 | Hinman | G06F 3/0649 |
| 2019/0065508 A1* | 2/2019 | Guturi | G06F 16/9027 |
| 2019/0272335 A1 | 9/2019 | Liu et al. | |
| 2021/0200646 A1 | 7/2021 | Hickey et al. | |
| 2022/0171679 A1* | 6/2022 | Caughman | G06F 3/067 |
| 2022/0229805 A1* | 7/2022 | Chakeres | G06F 11/2094 |
| 2022/0276987 A1* | 9/2022 | Guturi | G06F 16/164 |
| 2023/0032714 A1 | 2/2023 | Pandit et al. | |
| 2023/0056105 A1 | 2/2023 | Smith et al. | |

(Continued)

*Primary Examiner* — Chae M Ko
(74) *Attorney, Agent, or Firm* — Holland & Hart LLP

(57) ABSTRACT

Techniques for data management are described. A monotonically increasing time source that indicates an elapsed time since a reference event may be activated. Multiple snapshots of a computing object may be generated in accordance with a schedule for backing up the computing object, where the schedule may include a retention duration for retaining snapshots. Based on generating the snapshots, timestamps for the snapshots may be stored, where the timestamps may indicate respective values of the monotonically increasing time source. As part of an expiration job, a reference value of the monotonically increasing time source may be identified based on the retention duration and a current value indicated by the monotonically increasing time source. Also, a snapshot of the snapshots may be expired based on a timestamp of the snapshot corresponding to a value of the monotonically increasing time source that is less than the reference value.

20 Claims, 10 Drawing Sheets

(56) References Cited

U.S. PATENT DOCUMENTS

2023/0073371 A1\* 3/2023 Butt .................. G06F 3/0659
2023/0222092 A1  7/2023 Xiang et al.

\* cited by examiner

TIME VARIATION PROTECTION FOR SNAPSHOTS

RELATED APPLICATIONS

The present application is a continuation of U.S. patent application Ser. No. 17/739,927, filed May 9, 2022 and entitled "TIME VARIATION PROTECTION FOR SNAPSHOTS," which is assigned to the assignee hereof and is incorporated by reference herein in its entirety.

FIELD OF TECHNOLOGY

The present disclosure relates generally to data management, and more specifically to time variation protection for snapshots.

BACKGROUND

A computing system may be employed to manage, process, backup, and restore data using a network of computing devices.

Cloud providers may support multiple types of storage for varying customer needs. Software may be built to store data in a file system format and use disk-based data storage on cloud instances. However, disk-based data storage may suffer from issues of durability, reliability, and scalability. Some cloud providers may support immutable data storage, data storage with versioning, or both. Techniques for backing up data in cloud providers may be improved.

DETAILED DESCRIPTION

A computing system (e.g., a data management and server (DMS) system) may use a system time source to perform one or more jobs (e.g., a job for taking snapshots, a job for expiring snapshots, etc.). The system time source may be determined by synchronizing the system time source with a time maintained by a network time protocol (NTP) server. The system time source may be susceptible to variation or manipulation (e.g., by a system error or malicious actor). For example, a glitch or malicious actor may cause a time output by an NTP server to jump ahead by a duration (e.g., hours or days). In such cases, a system time source may also jump ahead of a true time by the duration, and, if an expiration job is executed while the system time source is incorrect, snapshots may be prematurely expired.

To prevent the premature expiration of snapshots, a second time source that is monotonic and hardened against time variation may be used as a reference for (or to support) jobs performed by the computing system. The second time source may be managed separately from the system time source. By contrast to the system time source, the second time source may be a monotonically increasing time source (e.g., the time source cannot move backwards in time). In further contrast to the system time source, the second time source may be hardened against time jumps—e.g., because the second time source use a monotonic clock to measure the progress of time instead of synchronizing to a time reference of an external server.

Figure 1:
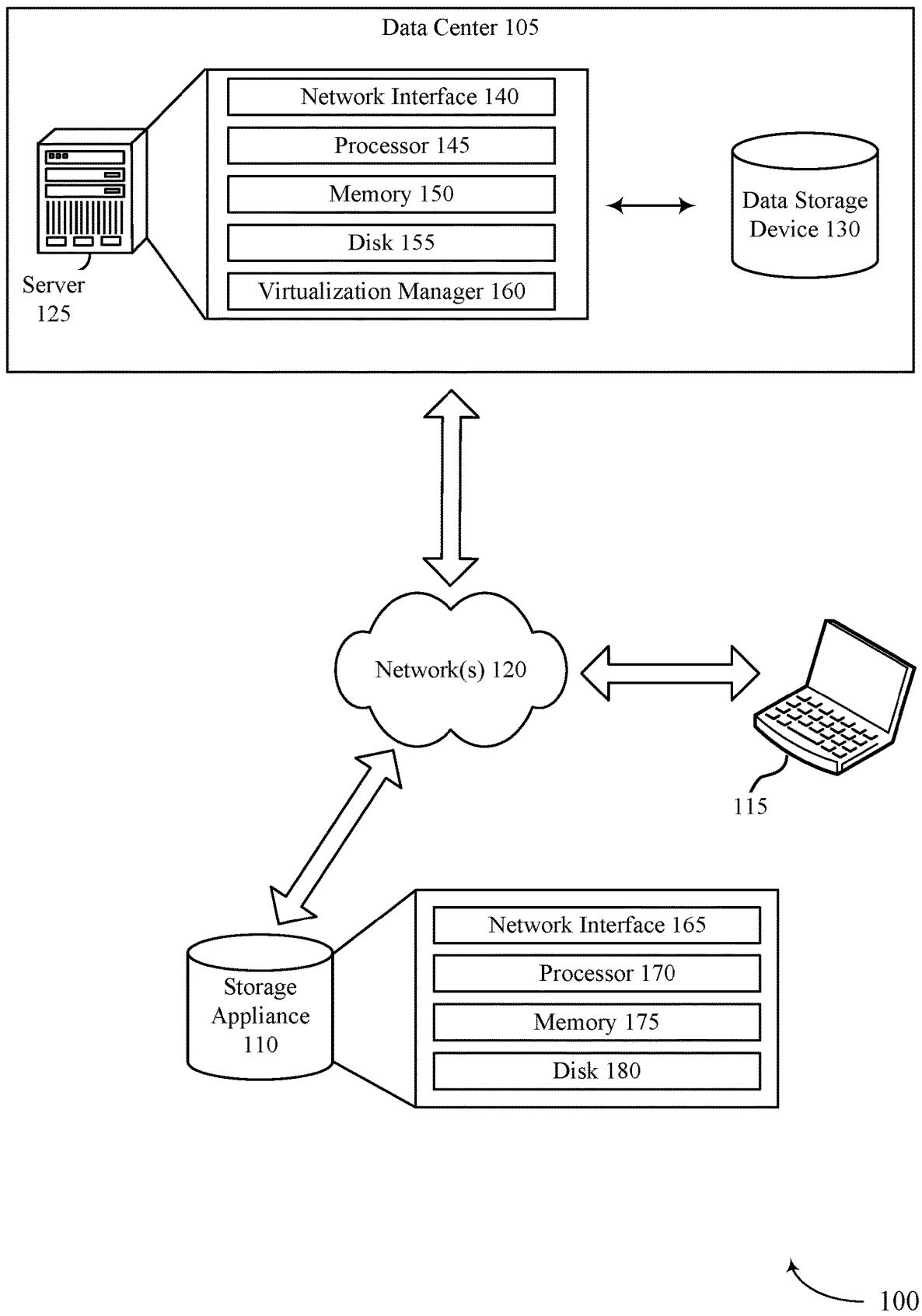
FIG. 1 shows an example of a computing environment that supports time variation protection for snapshots in accordance with examples as disclosed herein.

FIG. 1 shows an example of a computing environment that supports time variation protection for snapshots in accordance with examples as disclosed herein.

The computing environment 100 may include the data center 105, the storage appliance 110, and the computing device 115 in communication with each other via one or more networks 120. The computing environment 100 may also include one or more computing devices interconnected through the one or more networks 120. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The computing environment 100 may provide a cloud computing environment for one or more computing devices. Cloud computing may refer to Internet-based computing, wherein shared resources, software, and/or information may be provided to one or more computing devices on-demand via the Internet. The computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the computing environment 100 may include a virtualized infrastructure that provides software, data processing, and/or data storage services to end users accessing the services via the computing environment 100. In one example, the computing environment 100 may provide cloud-based work productivity or business-related applications to a computing device, such as the computing device 115.

In some examples, the computing environment 100 may provide remote access to secure applications and files stored within the data center 105 from a remote computing device, such as the computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as the computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

The computing device 115 may be a personal computing device, such as a stationary device (e.g., a desktop computer or access point) or a mobile device (e.g., a cellular phone, laptop, table, personal digital assistant). The computing device 115 may be a commercial computing device, such as a server or collection of servers. The computing device may be a virtual device, e.g., a virtual machine.

The data center 105 may include one or more servers, such as the server 125, and one or more storage devices, such as the storage device 130, that are in communication with the one or more servers.

A server, such as the server 125, may allow a client to download information or files (e.g., executable, text, application, audio, image, or video files) from the server 125 or to perform a search query related to particular information stored on the server 125. In some examples, a server may act as an application server or a file server. In general, the server 125 may refer to a hardware device that acts as the host in a client-server relationship or a software process that shares a resource with or performs work for one or more clients. In some examples, the server 125 may be used to create and manage one or more virtual machines associated with a virtualized infrastructure. The one or more virtual machines may run various applications, such as a database application or a web server. The server 125 may include the network interface 140, the processor 145, the memory 150, the disk 155, and the virtualization manager 160 all in communication with each other.

The network interface 140 may enable the server 125 to connect to the one or more networks 120. The network interface 140 may include a wireless network interface and/or a wired network interface. The processor 145 may enable the server 125 to execute computer-readable instructions stored in the memory 150 in order to perform processes described herein. The processor 145 may include one or more processing units, such as one or more CPUs and/or one or more GPUs. The memory 150 may comprise one or more types of memory (e.g., RAM, SRAM, DRAM, ROM, EEPROM, Flash, etc.). The disk 155 may include a hard disk drive and/or a solid-state drive. The memory 150 and the disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as a storage appliance within the data center 105 or the storage appliance 110. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance within the data center 105 or the storage appliance 110, described further below) in response to a request made by the storage appliance. After the data associated with the point-in-time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as the data center 105, may include multiple servers and/or data storage devices in communication with each other. The one or more data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

In some examples, the data center 105 includes a storage appliance (e.g., the storage appliance 110) that includes a data management system for backing up virtual machines or files within a virtualized infrastructure. A storage appliance within data center may be configured similar to the storage appliance 110. In some examples, a storage appliance in data center is an extension of the storage appliance 110. For example, a storage appliance in data center may be an agent for the storage appliance 110, where the agent may be implemented as software (e.g., installed at the server 125 or at a central server) or as hardware in the data center 105. When implemented as hardware, the server 125 and storage appliance may be in communication with each other via a networking fabric connecting servers and data storage units within the data center 105 to each other.

The one or more networks 120 may allow computing devices or storage devices to connect to and communicate with other computing devices or other storage devices in the computing environment 100. The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

The storage appliance 110 may comprise a cloud-based data management system for backing up virtual machines and/or files within a virtualized infrastructure, such as virtual machines running on the server 125 or files stored on the server 125. The storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines. The storage appliance 110 may include the network interface 165, the processor 170, the memory 175, and the disk 180, which may be configured similarly as the corresponding components of the server 125.

In some examples, the storage appliance 110 may manage the extraction and storage of virtual machine snapshots associated with different point-in-time versions of one or more virtual machines running within the data center 105. A snapshot of a virtual machine may correspond with a state of the virtual machine at a particular point-in-time. In some examples, a snapshot of a virtual machine captures a state of a file system as well as data changes (e.g., additions, updates, renaming, and/or deletions of data) that occurred between snapshots. A snapshot may be used to restore a virtual machine to a particular instance of time.

In response to a restore command from the storage device 130, the storage appliance 110 may restore a point-in-time version of a virtual machine or restore point-in-time versions of one or more files located on the virtual machine and transmit the restored data to the server 125. In response to a mount command from the server 125, the storage appliance 110 may allow a point-in-time version of a virtual machine to be mounted and allow the server 125 to read and/or modify data associated with the point-in-time version of the virtual machine. To improve storage density, the storage appliance 110 may deduplicate and compress data associated with different versions of a virtual machine and/or deduplicate and compress data associated with different virtual machines. To improve system performance, the storage appliance 110 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In some examples, storage appliance 110 is located within data center 105. In some examples, a storage appliance within data center 105 may similarly perform (e.g., instead of or in combination with storage appliance 110) the operations and functions described with reference to storage appliance 110.

The storage appliance 110 may be configured to take snapshots of a target object in accordance with a schedule (e.g., every ten minutes), whenever data changes are detected, or both. To preserve space in the storage appliance 110, the storage appliance 110 may delete snapshots for the target object. That said, to maintain an expected restoration capability for a target object, the storage application may delete snapshots in accordance with a service level agreement established for the target object. Put another way, the storage appliance 110 may retain snapshots of the target object in accordance with the service level agreement to ensure that a customer is able to restore the target object to an expected point in time. For example, the service level agreement established for the target object may provide that for each hour within a time period (e.g., a five hour time period), at least one snapshot is to be retained for the target object. Additionally, or alternatively, the service level agreement established for the target object may provide that snapshots older than a second time period (e.g., a month) are to be deleted for the target object. In some examples, snapshots of the target object may be expired (e.g., deleted or consolidated with other snapshots) when an expiration job is performed at storage appliance 110.

A retention scheme that involves retaining at least one snapshot within intervals of a time period may be referred to as an expiration-by-frequency scheme. To support a retention-by-frequency scheme, an expiration job may partition a portion of a system timeline into consecutive intervals (which may be referred to as logical buckets). Each interval may have a same length. For example, if a service level agreement specifies a frequency of two hours within a ten hour retention duration, a latest ten hour portion of the system timeline may be partitioned into five two-hour intervals. In some examples, to comply with the service level agreement that specifies a frequency of two hours and a retention duration of ten hours, a latest twelve hour portion of the system timeline may be partitioned into six consecutive intervals. That is, an extra interval may be established on the system timeline.

After partitioning the system timeline into consecutive intervals, the expiration job may expire snapshots within each of the consecutive intervals such that a single snapshot is left in each consecutive interval. Expiring the snapshots within one of the consecutive intervals may include deleting snapshots that occur before a latest snapshot in the consecutive interval. Additionally, or alternatively, expiring the snapshot within one of the consecutive intervals may include consolidating, with the latest snapshot in the consecutive interval, snapshots that occur before the latest snapshot in the consecutive interval—e.g., if the latest snapshot is an incremental snapshot and the snapshots are base or intermediary snapshots to the latest snapshot. In some examples (depending on the service level agreement), the expiration job may expire snapshots within each of the consecutive intervals such that two snapshot are left in each consecutive interval: an earliest and a latest snapshot in each of the consecutive intervals. Additionally, snapshots that occur prior to the earliest interval of the consecutive intervals may be expired.

A retention scheme that involves retaining snapshots that are younger than a threshold age (that is, that have existed for a threshold duration) may be referred to as an expiration-by retention scheme. To support a retention-by-expiration scheme, timestamps of the snapshots may be used to determine an age of the snapshots such that snapshots that are older than a threshold age may be expired. Expiring the snapshots may include deleting the snapshots or consolidating one or more of the snapshots with related snapshots that are younger than the threshold age.

The storage appliance 110 may obtain the system timeline and generate timestamp information based on a system time source. The system time source may be internal or external to storage appliance 110. In some examples, the system time source may be synchronized with an external time source, such as an external time source generated by a network time protocol (NTP) server.

A system time source may be susceptible to variation or manipulation (e.g., by a system error, a malicious actor that gains high-level access to the storage appliance 110, a malicious actor that gains access to an NTP server, a scenario or malicious actor that prevents access to an NTP server, etc.). For example, a glitch or malicious actor may cause a time output by an NTP server to jump ahead by a duration (e.g., hours or days). In such cases, a system time source may also jump ahead of a true time by the duration, and, if an expiration job is executed while the system time source is incorrect, snapshots may be prematurely expired regardless of whether an retention-by-frequency or an retention-by-duration scheme is used by the storage appliance 110. That is, for a retention-by-frequency scheme, the consecutive intervals may be established based on the artificially current timepoint such that snapshots that should be retained based on the true current timepoint may be determined as occurring prior to an earliest interval of the consecutive intervals. Accordingly, these snapshots may be prematurely expired. Similarly, for a retention-by-duration scheme, snapshots that should be retained based on the true current timepoint may be determined as occurring prior to a timepoint that is obtained by subtracting the retention duration from the artificially current timepoint. Accordingly, these snapshots may be prematurely expired.

To prevent the premature expiration of snapshots, a second time source that is monotonic and hardened against time variation may be used as a reference for an expiration job. The second time source may be managed separately from a system time source and may be accessed via an application program interface. By contrast to the system time source, the second time source may be a monotonically increasing time source (e.g., the time source will flat line if a backwards time jump is detected). In further contrast to the system time source, the second time source may be hardened against time jumps—e.g., because the second time source use a monotonic clock to measure the progress of time instead of synchronizing to a time reference of an external server. In some examples, the second time source may be configured to measure an elapsed time since the occurrence of an event—e.g., by counting a quantity of unit intervals (e.g., nanoseconds) that have elapsed since the event. The event may be the initialization of a computing system, such as server cluster.

When the second time source is used for a server cluster, each node in the server cluster may include a monotonic clock, and one node of the cluster may be selected as an oracle node. Each of the non-oracle nodes in the server cluster may synchronize its monotonic clock to the monotonic clock of the oracle node (so long as synchronizing does not involve moving backward in time). In some examples, if a monotonic clock of a non-oracle node is ahead of the monotonic clock of the oracle node, the non-oracle node may propose itself as the oracle node. If the non-oracle node becomes the new oracle node, then the other nodes may synchronize their monotonic clocks to the monotonic clock of the new oracle node. Due to the nature of the monotonic clocks each measuring an elapsed time since an event, time jumps by a node to synchronize its monotonic clock with a monotonic clock of an oracle node may be maintained below a threshold based on drift between the monotonic clock and a synchronization interval.

Manipulation of the second time source may be more difficult than manipulation of the system time source—e.g., because the second time source may be fully contained within a server cluster. Thus, to compromise the second time source an attack would need root access to the server cluster. By contrast, whether an NTP server used by a system time source is manipulated or fails occurs externally to the server cluster. Also, the security and functionality of the NTP server may be outside the control of an operator of the server cluster.

In some examples, the storage appliance 110 may activate a monotonically increasing time source that indicates an elapsed time since a reference event (e.g., an initialization of the storage appliance 110). After initialization, the storage appliance 110 may generate multiple snapshots of a computing object (e.g., a file system, database, virtual machine, etc.). The storage appliance 110 may generated the multiple snapshots in accordance with a schedule for backing up the computing object, where the schedule may indicate when to take snapshots of the computing object. The schedule may also indicate a scheme for retaining snapshots for the target object. In some examples, the storage appliance 110 generates a snapshot on a periodic basis (e.g., hourly) based on the schedule. Additionally, or alternatively, the storage appliance 110 may be configured to generate a snapshot when an event occurs at the computing object based on the schedule. Based on generating the snapshots, the storage appliance 110 may store timestamps for the snapshots, where the timestamps may be determined with reference to the monotonically increasing time source.

Based on generating the snapshots, an expiration job for expiring one or more of the snapshots may be triggered (e.g., to increase an available capacity of the storage appliance 110. As part of the expiration job, the storage appliance 110 may identify a reference value of the monotonically increasing time source by subtracting the retention duration from the current value indicated by the time source. The storage appliance 110 may then expire one or more snapshots of the snapshots based on comparing a timestamps of the snapshots with the reference value—e.g., snapshots having timestamps that precede the reference value may be expired. Expiring the one or more snapshots may include deleting the one or more snapshots, consolidating the one or more snapshots with other snapshots, or both.

By using the monotonic time source instead of the system time source to execute an expiration job, the premature expiration of snapshots that may be caused by time jumps in the system time source may be avoided.

Figure 2:
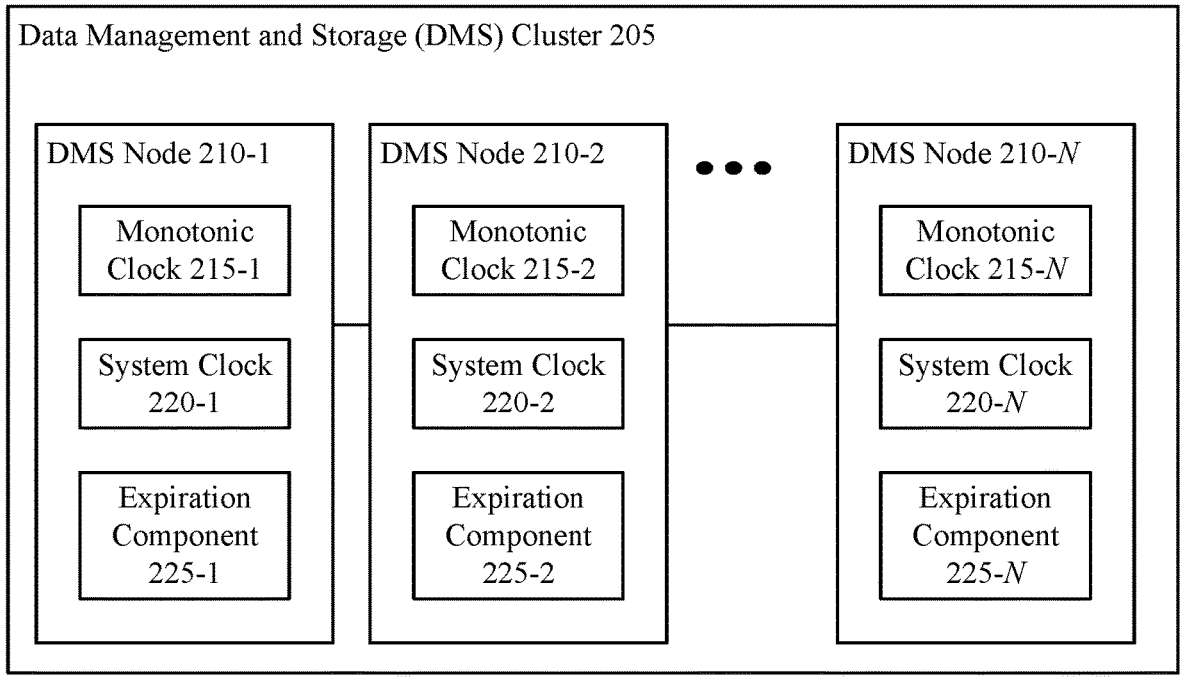
FIG. 2 shows an example of a distributed system that supports time variation protection for snapshots in accordance with examples as disclosed herein.

FIG. 2 shows an example of a distributed system that supports time variation protection for snapshots in accordance with examples as disclosed herein.

The DMS cluster 205 may include the multiple DMS nodes 210. The DMS nodes 210 may provide a distributed environment for backing up and taking snapshots of a target object. In some examples, the DMS cluster 205 is or is included in the storage appliance 110 of FIG. 1.

The first DMS node 210-1 may be configured to store all or a portion of backup and snapshot data for a target object. The first DMS node 210-1 may include the first monotonic clock 215-1, which may be used to monitor an amount of time that has elapsed since an initialization of the DMS cluster 205. The first monotonic clock 215-1 may be configured to measure a quantity of unit intervals that have occurred since the DMS cluster 205 was initialized. The first monotonic clock 215-1 may be further configured to convert the measured quantity of unit intervals to a wall-clock time. The first monotonic clock 215-1 may be configured to synchronize with a monotonic clock of another DMS node 210 (which may be referred to as the oracle DMS node). If the synchronization timepoint of the oracle DMS node is less than a current timepoint of the first monotonic clock 215-1, the first monotonic clock 215-1 may maintain its current timepoint—e.g., until the monotonic clock of the oracle node catches up to the first monotonic clock 215-1. In some examples, the first monotonic clock 215-1 may request that first take over as the oracle—e.g., if the first monotonic clock 215-1 is ahead of the monotonic clock of the oracle node.

The first DMS node 210-1 may also include the first system clock 220-1. The first system clock 220-1 may be configured to provide a wall-clock time by synchronizing its time with a time provided by an NTP server.

The first DMS node 210-1 may include first expiration component 225-1. First expiration component 225-1 may be configured to execute an expiration job—e.g., in accordance with a retention-by-frequency scheme or a retention-by-duration scheme. As part of executing the expiration job in accordance with a retention-by-frequency scheme, the first expiration component 225-1 may use a cluster timeline provided by the first monotonic clock 215-1 to determine a quantity of logical buckets (e.g., consecutive intervals) to establish on a cluster timeline provided by the such that snapshots will not be prematurely expired. Alternatively, as part of executing the expiration job in accordance with a retention-by-frequency scheme, the first expiration component 225-1 may use a cluster timeline provided by the first monotonic clock 215-1 to identify a reference snapshot, where the reference snapshot may be used to determine a quantity of logical buckets to establish on a system timeline provided by the first system clock 220-1 such that snapshots will not be prematurely expired. Techniques for establishing the logical buckets are described in further detail herein and with reference to FIGS. 3 and 5.

As part of executing the expiration job in accordance with a retention-by-duration scheme, the first expiration component 225-1 may be configured to generate timestamps for snapshots with reference to the first monotonic clock 215-1. The first expiration component 225-1 may be further configured to compute an expiration timepoint relative to a current timepoint provided by the first monotonic clock 215-1—e.g., by subtracting a retention duration from the current timepoint of the first monotonic clock 215-1. The first expiration component 225-1 may be configured to expire snapshots having timestamps that are older than the expiration timepoint.

The second DMS node 210-2 through the Nth DMS node 210-N may be configured similar to the first DMS node 210-1.

Figure 3:
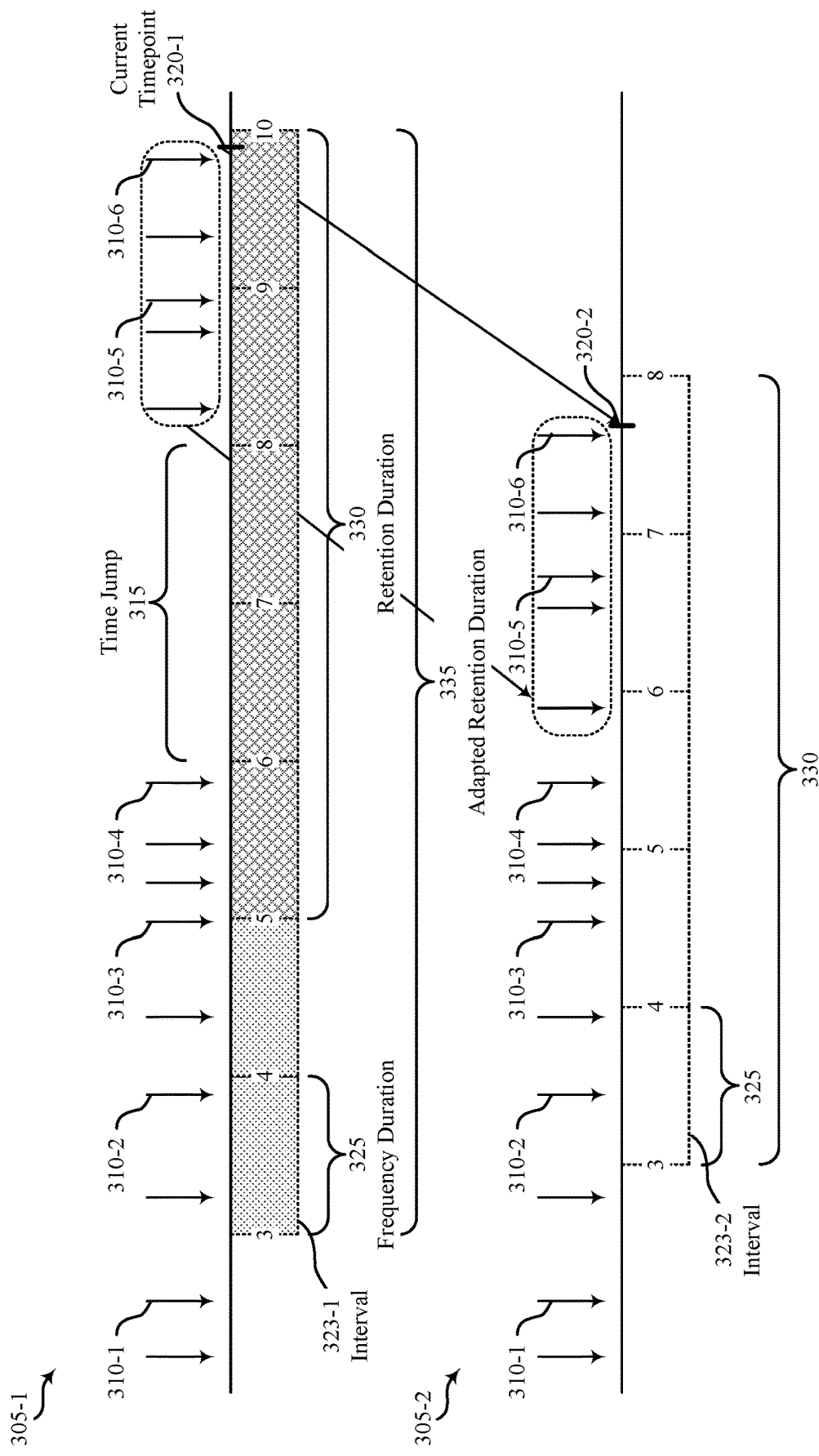
FIGS. 3 and 4 show examples of snapshot diagrams that depicts time variation protection for snapshots in accordance with examples as disclosed herein.

FIG. 3 shows an example of a snapshot diagram that depicts time variation protection for snapshots in accordance with examples as disclosed herein.

The first timeline 305-1 depicts the snapshots 310 taken for a target object with reference to a system timeline that has experienced the time jump 315. The time jump 315 may be a two-hour jump forward-in-time (e.g., from 6 o'clock to 8 o'clock).

The second timeline 305-2 depicts the snapshots 310 taken for the target object with reference to a cluster timeline generated using a monotonic clock. The second timeline may indicate wall-clock times that are derived from a quantity of unit intervals measured by the monotonic clock. FIG. 3 also depicts the partitioning of a portion of the first timeline 305-1 and the second timeline 305-2 into consecutive intervals 323.

In some examples, a snapshot of a target object may be taken periodically, based on the occurrence of an event (e.g., a data change, a data deletion, a data addition, etc.), or both. The snapshots 310 taken of the target object may include the first snapshot 310-1 through the sixth snapshot 310-6. The snapshots 310 shown with reference to the second timeline 305-2 may be reproduction of the snapshots 310 shown with reference to the first timeline 305-1.

Subsequently, an expiration job that uses the first timeline 305-1, the second timeline 305-2, or both, may be triggered (e.g., to free up space in a DMS cluster). As part of the expiration job, a portion of the second timeline 305-2 may be partitioned into consecutive intervals (e.g., one-hour intervals). The consecutive intervals may each start and end with a common reference timepoint (e.g., an hour mark, a half-hour mark) on the second timeline 305-2. In some examples, the latest common reference timepoint may be different the second current timepoint 320-2. In some examples, the latest common reference timepoint and second latest common reference timepoint on the second timeline 305-2 may encompass the second current timepoint 320-2. The quantity of consecutive intervals may be based on the retention duration 330, where the retention duration may be designated in a service level agreement. For example, the quantity of consecutive intervals may be derived by dividing a length of the retention duration 330 by a length of the frequency duration 325 and adding one to the quotient $$\text{(i.e., \# ConsIntervals} = 1 + \frac{dur_{ret}}{dur_{freq}}.$$

In some examples, as a next part of the expiration job, snapshots within each of the consecutive intervals may be expired such that, depending on the service level agreement, one snapshot (e.g., the latest snapshot) or two snapshots (e.g., the earliest and the latest snapshots) remain in each consecutive interval—e.g., if timestamps for the snapshots 310 are taken with reference to the second timeline 305-2.

By identifying a set of consecutive intervals on the second timeline 305-2 to use for expiring snapshots, a time jump in the system time source can be accommodated while avoiding the premature expiration of snapshots.

In some examples, as a next part of the expiration job that uses the first timeline 305-1, a second set of consecutive intervals (e.g., one-hour intervals) may be established with reference to the first timeline 305-1—e.g., if the expiration job operates based on the system timeline and timestamps for the snapshots 310 are taken with reference to the first timeline 305-1. In such cases, prior to establishing the second set of consecutive intervals, the set of consecutive intervals generated for the second timeline 305-2 may be used to identify a reference snapshot ($S_{ref}$) on the first timeline 305-1. For example, the earliest snapshot on the first timeline 305-1 that occurs after a beginning of the first interval of the set of consecutive intervals on the second timeline 305-2 (e.g., the second snapshot 310-2) may be identified. In some examples, after the reference snapshot is identified, the expiration job may determine a timestamp of the reference snapshot with reference to the first timeline 305-1.

Based on identifying the reference snapshot, a minimum quantity of the second set of consecutive intervals for covering the reference snapshot may be determined. For example, it may be determined that seven consecutive intervals of the frequency duration are sufficient to cover the second snapshot 310-2. For example, the quantity of consecutive intervals may be derived by determining a maximum value between the minimum quantity of consecutive intervals for covering the reference snapshot and the result of dividing a length of the retention duration 330 by a length of the frequency duration 325 and adding one to the quotient—

$$\text{i.e., \# ConsIntervals} = \max\left(\left(1 + \frac{dur_{ret}}{dur_{freq}}\right), \text{min \# intervals to cover } S_{ref}\right).$$

After determining the quantity of consecutive intervals for the second set of consecutive intervals, the corresponding portion of the first timeline 305-1 may be partitioned into the second set of consecutive intervals. The second set of consecutive intervals may each start and end with a common reference timepoint (e.g., an hour mark, a half-hour mark) on the first timeline 305-1. In some examples, the latest common reference timepoint may be different the first current timepoint 320-1. In some examples, the latest common reference timepoint and second latest common reference timepoint on the first timeline 305-1 may encompass the first current timepoint 320-1.

Accordingly, the second set of consecutive intervals may correspond to the adapted retention duration 335, where a length of the adapted retention duration 335 may be greater than a length of the retention duration 330. As a further part of the expiration job, snapshots within each of the consecutive intervals may be expired such that, depending on the service level agreement, one snapshot (e.g., the latest snapshot) or two snapshots (e.g., the earliest and the latest snapshots) remain in each consecutive interval of the second set of consecutive intervals.

By using the consecutive intervals of the second timeline 305-2 to identify a reference snapshot with reference to the first timeline 305-1, an expiration job that is configured to operate using a system time source can use a monotonic time source in conjunction with the system time source to prevent the premature expiration of snapshots. Also, by identifying a set of consecutive intervals on the first timeline 305-1 that is sufficient to cover the reference snapshot to use for expiring snapshots, a time jump in the system time source can be accommodated while avoiding the premature expiration of snapshots.

Figure 4:
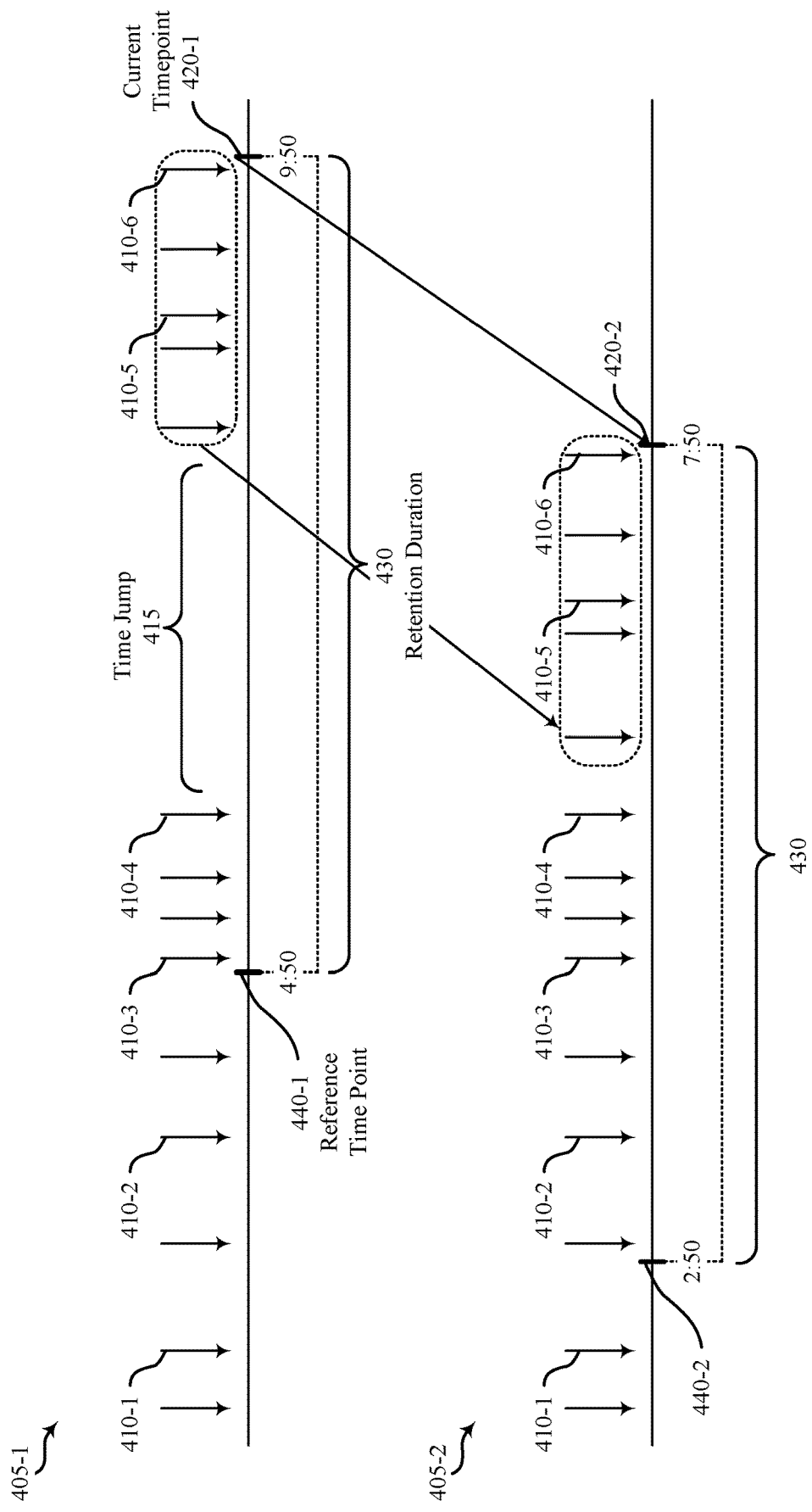

FIG. 4 shows an example of a snapshot diagram that depicts time variation protection for snapshots in accordance with examples as disclosed herein.

As similarly described with reference to FIG. 3, the first timeline 405-1 depicts the snapshots 410 taken for a target object with reference to a system timeline that has experienced the time jump 415, and the second timeline 405-2 depicts the snapshots 410 taken for the target object with reference to a cluster timeline generated using a monotonic clock.

In some examples, a snapshot of a target object may be taken periodically, based on the occurrence of an event (e.g., a data change, a data deletion, a data addition, etc.), or both. The snapshots 410 taken of the target object may include the first snapshot 410-1 through the sixth snapshot 410-6. The snapshots 410 shown with reference to the second timeline 405-2 may be reproduction of the snapshots 410 shown with reference to the first timeline 405-1.

Subsequently, an expiration job that uses the second timeline 405-2 may be triggered (e.g., to free up space in a DMS cluster). As part of the expiration job, the second reference timepoint 440-2 may be determined relative to the second current timepoint 420-2 on the second timeline 405-2. The second reference timepoint 440-2 may be separated from the second current timepoint 420-2 by the retention duration 430. Based on identifying the second reference timepoint 440-2, the expiration job may proceed to expire the snapshots that occur prior to the second reference timepoint 440-2.

By comparison, if the expiration job were to use the first timeline 405-1 and expire the snapshots that occurred prior to the first reference timepoint 440-1, up to three snapshots (including second snapshot 410-2) may be prematurely expired due to the time jump 415.

Figure 5:
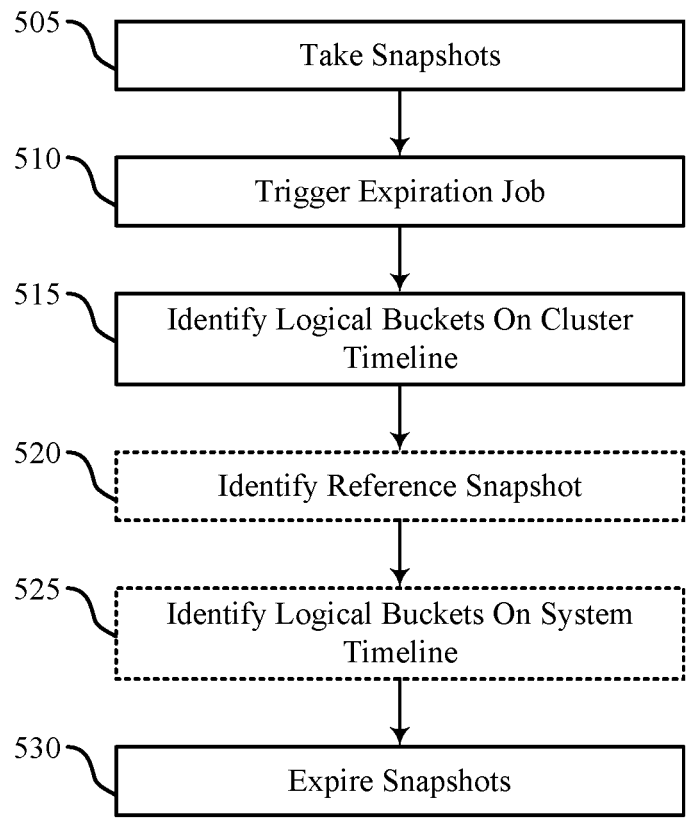
FIGS. 5 and 6 show examples of a set of operations for time variation protection for snapshots in accordance with examples as disclosed herein.

FIG. 5 shows an example of a set of operations for time variation protection for snapshots in accordance with examples as disclosed herein.

Flowchart 500 may be performed by a storage system, which may be an example of, or include, a storage appliance described herein. In some examples, flowchart 500 shows an example set of operations performed to support time variation protection for snapshots. For example, flowchart 500 may include operations for using a monotonic time source to identify logical buckets for expiring snapshots. In some examples, flowchart 500 includes operations for using the monotonic time source to identify logical buckets for a system time source for expiring snapshots.

Aspects of the flowchart 500 may be implemented by a controller, among other components. Additionally, or alternatively, aspects of the flowchart 500 may be implemented as instructions stored in memory (e.g., firmware stored in a memory coupled with a controller). For example, the instructions, when executed by a controller may cause the controller to perform the operations of the flowchart 500.

One or more of the operations described in flowchart 500 may be performed earlier or later, omitted, replaced, supplemented, or combined with another operation. Also, additional operations described herein may replace, supplement or be combined with one or more of the operations described in flowchart 500.

At 505, snapshots of one or more target objects (e.g., file systems, databases, virtual machines, etc.) may be taken. The snapshots may be taken in accordance with a schedule (e.g., every hour, every other hour, every day, every other day, etc.). Additionally, or alternatively, the snapshots may be taken in response to the occurrence of events (e.g., data changes, login attempts, etc.). In some examples, multiple snapshots may be taken within a scheduled snapshot interval—e.g., if multiple events occur during the snapshot interval.

At 510, an expiration job may be triggered to expire (e.g., delete or consolidate) one or more snapshots taken for the target object. The expiration job may be triggered based on a the occurrence of an event—e.g., an available capacity for storing snapshots of a target object reaching a threshold, a duration since the last execution of the expiration job elapsing, a quantity of snapshots taken of the target object exceeding a threshold, etc. In some examples, the expiration job may be performed in accordance with a service level agreement for the target object. For example, the expiration job may be performed in accordance with a retention-by-frequency scheme that designates a retention duration (e.g., four hours) and a frequency duration (e.g., 1 hour) for retaining snapshots taken for the target object. In such cases, over a duration of five hours, one or more snapshots within each hour interval may be retained, while snapshots that occur prior to the fiver hour duration and other snapshots within the hour intervals may be candidates for expiration.

At 515, logical buckets may be identified on a cluster timeline that is generated using a monotonic time source. The logical buckets may be determined based on the retention duration and frequency duration designated for the target object. For example, a quantity of logical buckets may be determined based on the retention duration and the frequency duration—e.g., if the retention duration is four hours and the frequency duration is one hour, it may be determined to use five logical buckets $$\left(1 + \frac{4 \text{ hr}}{1 \text{ hr}}\right).$$

Also, based on a current timepoint of the monotonic time source, a position of the logical buckets on the cluster timeline may be determined such that a latest logical bucket encompasses the current timepoint of the monotonic time source. The position of the logical buckets may be further determined such that each logical bucket begins and ends with a common time reference that is independent of the current timepoint of the monotonic time source—e.g., each logical bucket may begin and end on an hour mark.

In some examples, after identifying the logical buckets, the expiration job may proceed to expire snapshots using the logical buckets as similarly outlined with reference to the operations described at 530. For example, the snapshots that occur prior to the earliest logical bucket may be expired. Also, a subset of the snapshots within the logical buckets may be expired—e.g., such that an earliest snapshot, latest snapshot, or both, may be retained in each logical bucket.

At 520, a reference snapshot may be identified based on the logical buckets. For example, the earliest snapshot to occur within the initial logical bucket of the logical buckets may be identified as the reference snapshot. The reference snapshot may be determined with reference to a system timeline. In some examples, the beginning of the initial logical bucket is mapped to a corresponding timepoint on the system time—e.g., a 3:00 timepoint on the cluster timeline may be mapped to a 3:30 timepoint on the system timeline. The reference snapshot may have the earliest timestamp that occurs after the system timepoint (e.g., 3:50).

At 525, second logical buckets may be identified on the system timeline that is generated using a system time source (e.g., an internal system clock that is synchronized to an NTP server). The second logical buckets may be determined based on the retention duration and frequency duration designated for the target object as well as the quantity of logical buckets determined for the cluster timeline.

For example, a first quantity of second logical buckets may be determined based on the retention duration and the frequency duration—e.g., if the retention duration is four hours and the frequency duration is one hour, it may be determined to use five logical buckets $$\left(1 + \frac{4 \text{ hr}}{1 \text{ hr}}\right).$$

Also, a second quantity of second logical buckets may be determined based on the reference snapshot—e.g., a minimum quantity of second logical buckets for covering the reference snapshot may be determined. To determine the minimum quantity of second logical buckets for covering the reference snapshot, a timestamp of the reference snapshot and a logical bucket that encompasses the timestamp may be determined. Starting with the logical bucket, consecutive logical buckets may be generated until the current timepoint on the system timeline is encompassed by a last logical bucket, where the minimum quantity of logical buckets is equivalent to the quantity of consecutive logical buckets.

In some examples, the second quantity of second logical buckets is the same as the first quantity of second logical buckets—e.g., if the system time source has not been manipulated. In other examples, the second quantity of logical buckets is different than (e.g., greater than) the first quantity of second logical buckets—e.g., if there has been a time jump in the system time source. When the second quantity of logical buckets is different than the first quantity of second logical buckets, the larger of the two quantities may be selected. For example, if the system time source experiences a two hour time jump and seven logical buckets are determined for covering the reference snapshot, it may be determined to partition establish seven $$\text{(e.g., } \max\left(\left(1 + \frac{4 \text{ hr}}{1 \text{ hr}}\right), 7\right)\text{)}$$

consecutive logical buckets on a trailing portion of the system timeline.

At 530, the snapshots may be expired using the logical buckets. Expiring the snapshots may include deleting that occur prior to the beginning of the earliest logical bucket. Additionally, or alternatively, expiring the snapshots may include consolidating one or more snapshots that occur prior to the beginning of the earliest logical bucket with a snapshot that occurs within one of the logical buckets.

Expiring the snapshots may also include expiring snapshots that occur within logical buckets. In some examples, the snapshots within each logical bucket are either deleted or consolidated such that a single snapshot representing the latest snapshot of the target object within the logical bucket is retained. In some examples, the snapshots within each logical bucket are either deleted or consolidated such that a first snapshot representing the earliest snapshot of the target object within the logical bucket is retained and that a second snapshot representing the latest snapshot of the target object within the logical bucket is retained.

In an example where the first logical buckets on the cluster timeline are used by the expiration job, the snapshots within each of the first logical buckets may be expired as described above. In an example where the second logical buckets on the system timeline are used by the expiration job, the snapshots within each of the second logical buckets may be expired as described above.

Figure 6:
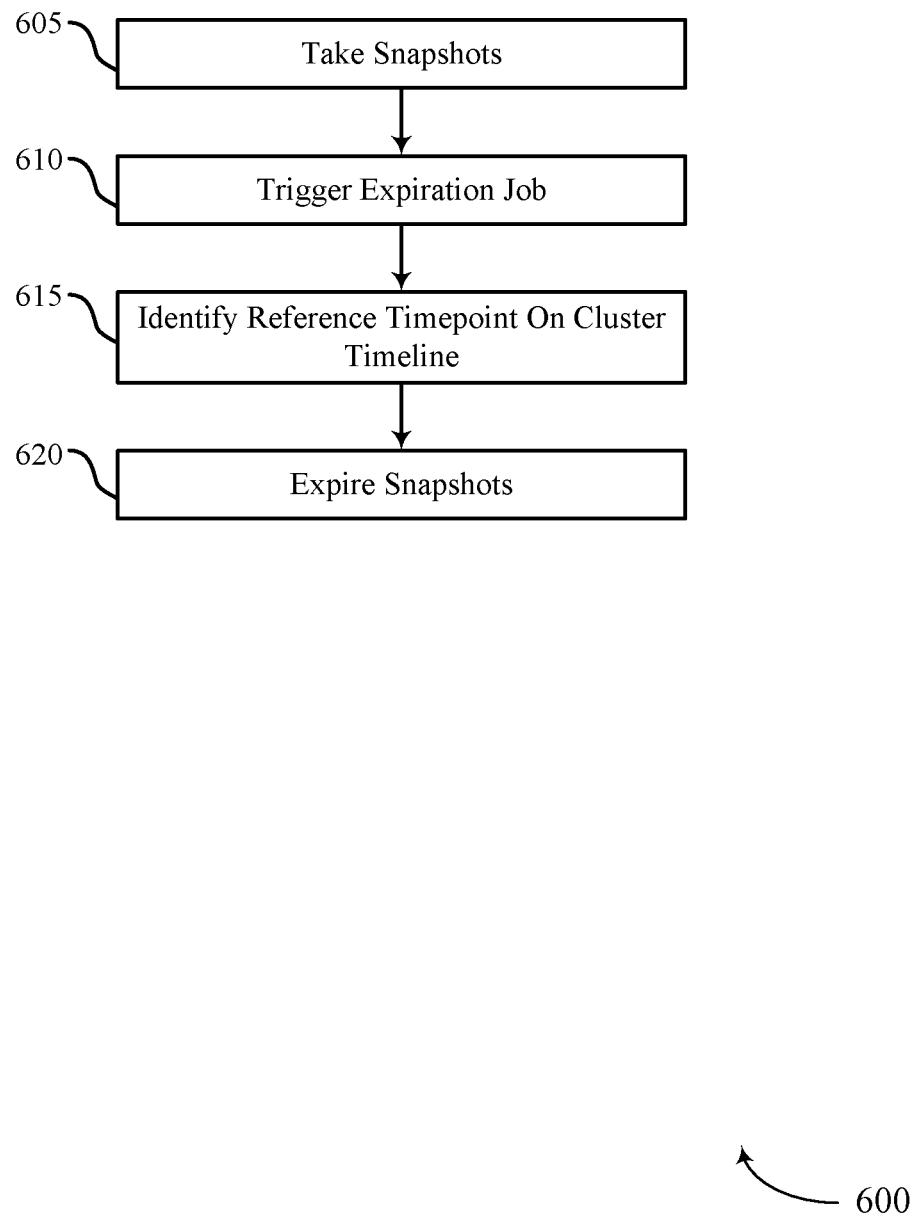

FIG. 6 shows an example of a set of operations for time variation protection for snapshots in accordance with examples as disclosed herein.

Flowchart 600 may be performed by a storage system, which may be an example of, or include, a storage appliance described herein. In some examples, flowchart 600 shows an example set of operations performed to support time variation protection for snapshots. For example, flowchart 600 may include operations for using a monotonic time source to identify logical buckets for expiring snapshots. In some examples, flowchart 600 includes operations for using the monotonic time source to identify logical buckets for a system time source for expiring snapshots.

Aspects of the flowchart 600 may be implemented by a controller, among other components. Additionally, or alternatively, aspects of the flowchart 600 may be implemented as instructions stored in memory (e.g., firmware stored in a memory coupled with a controller). For example, the instructions, when executed by a controller may cause the controller to perform the operations of the flowchart 600.

One or more of the operations described in flowchart 600 may be performed earlier or later, omitted, replaced, supplemented, or combined with another operation. Also, additional operations described herein may replace, supplement or be combined with one or more of the operations described in flowchart 600.

At 605, snapshots may be taken for one or more target objects as similarly described with reference to the operations described at 505.

At 610, an expiration job may be triggered as similarly described with reference to the operations described at 510. The expiration job may be performed in accordance with a retention-by-duration scheme that designates a retention duration for retaining snapshots taken for the target object— e.g., in a service level agreement.

At 615, a reference timepoint (e.g., a reference timestamp) may be determined on the cluster timeline relative to a current timepoint on the cluster timeline. The reference timepoint may be separated from the current timepoint by a retention duration established for the target object.

At 620, snapshots on the cluster timeline that occur prior to the reference timepoint may be expired. In some examples, snapshots that occur prior to the reference timepoint are identified by comparing a timestamp of the snapshots taken using the cluster time source with the reference timepoint. Expiring the snapshots that occur prior to the reference time point may include deleting the snapshots, consolidating one or more of the snapshots with one or more snapshots that occur after the reference time point, or both.

Figure 7:
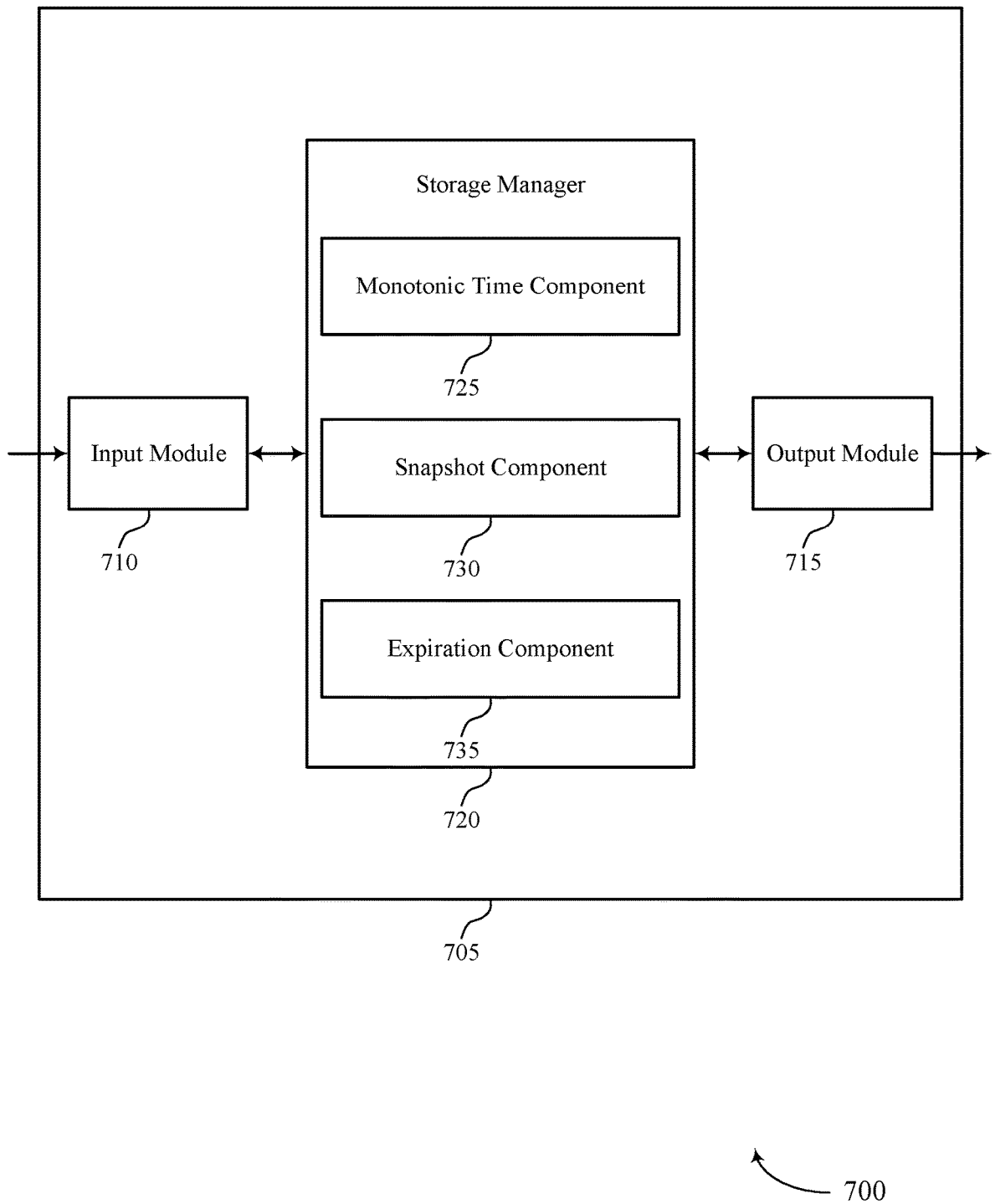
FIG. 7 shows a block diagram of an apparatus that supports time variation protection for snapshots in accordance with examples disclosed herein.

FIG. 7 shows a block diagram 700 of a device 705 that supports time variation protection for snapshots in accordance with examples disclosed herein. The device 705 may include an input module 710, an output module 715, and a storage manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the storage manager 720 to support time variation protection for snapshots. In some cases, the input module 710 may be a component of an I/O controller 910 as described with reference to FIG. 9.

The output module 715 may manage output signals for the device 705. For example, the output module 715 may receive signals from other components of the device 705, such as the storage manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the storage manager 720 may include a monotonic time component 725, a snapshot component 730, an expiration component 735, or any combination thereof. In some examples, the storage manager 720, or various components thereof, may be configured to perform various operations (e.g., receiving, monitoring, transmitting) using or otherwise in cooperation with the input module 710, the output module 715, or both. For example, the storage manager 720 may receive information from the input module 710, send information to the output module 715, or be integrated in combination with the input module 710, the output module 715, or both to receive information, transmit information, or perform various other operations as described herein.

The monotonic time component 725 may be configured as or otherwise support a means for activating a monotonically increasing time source that indicates an elapsed time since a reference event. The snapshot component 730 may be configured as or otherwise support a means for generating a set of multiple snapshots of a computing object in accordance with a schedule for backing up the computing object, the schedule including a retention duration for retaining snapshots of the set of multiple snapshots. The snapshot component 730 may be configured as or otherwise support a means for storing a set of multiple timestamps for the set of multiple snapshots, the set of multiple timestamps indicating respective values of the monotonically increasing time source associated with generating respective snapshots of the set of multiple snapshots. The expiration component 735 may be configured as or otherwise support a means for identifying, as part of an expiration job for expiring one or more of the set of multiple snapshots, a reference value of the monotonically increasing time source, the reference value of the monotonically increasing time source based on the retention duration and a current value indicated by the monotonically increasing time source. The expiration component 735 may be configured as or otherwise support a means for expiring a snapshot of the set of multiple snapshots based on a timestamp for the snapshot corresponding to a value of the monotonically increasing time source that is less than the reference value of the monotonically increasing time source.

Figure 8:
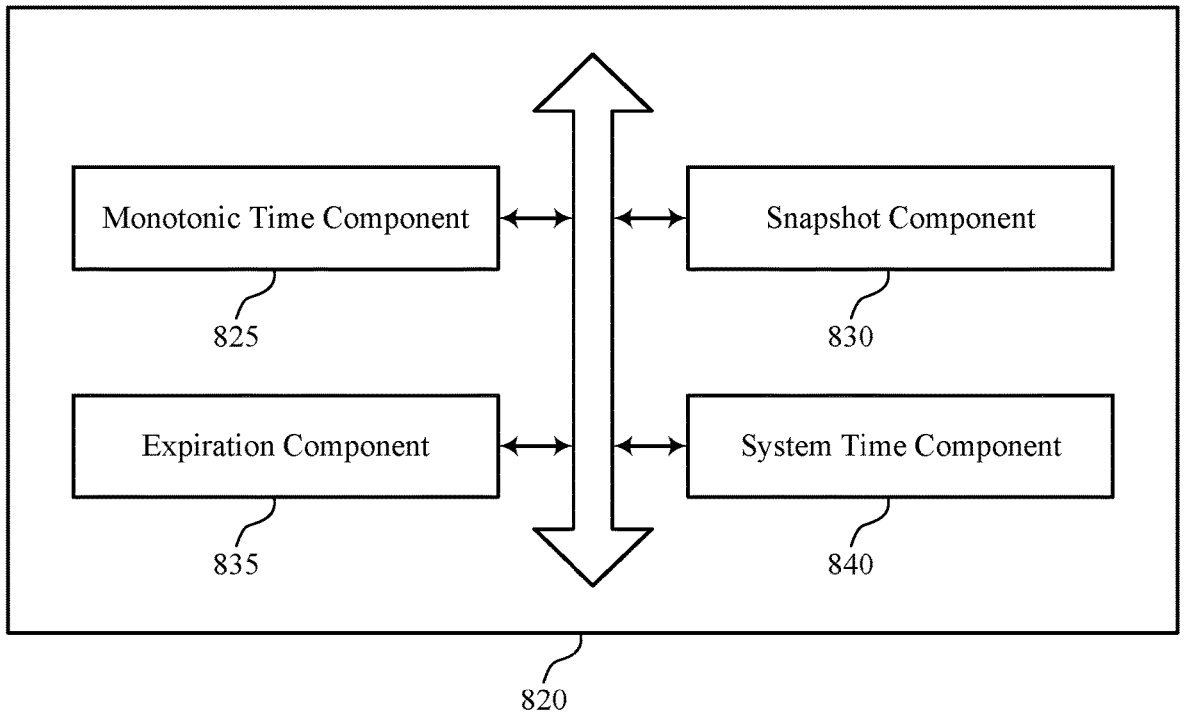
FIG. 8 shows a block diagram of a storage manager that supports time variation protection for snapshots in accordance with examples disclosed herein.

FIG. 8 shows a block diagram 800 of a storage manager 820 that supports time variation protection for snapshots in accordance with examples disclosed herein. The storage manager 820 may be an example of aspects of a storage manager or a storage manager 720, or both, as described herein. The storage manager 820, or various components thereof, may be an example of means for performing various aspects of time variation protection for snapshots as described herein. For example, the storage manager 820 may include a monotonic time component 825, a snapshot component 830, an expiration component 835, a system time component 840, or any combination thereof. Each of these components may communicate, directly or indirectly, with one another (e.g., via one or more buses).

The monotonic time component 825 may be configured as or otherwise support a means for activating a monotonically increasing time source that indicates an elapsed time since a reference event. The snapshot component 830 may be configured as or otherwise support a means for generating a set of multiple snapshots of a computing object in accordance with a schedule for backing up the computing object, the schedule including a retention duration for retaining snapshots of the set of multiple snapshots. In some examples, the snapshot component 830 may be configured as or otherwise support a means for storing a set of multiple timestamps for the set of multiple snapshots, the set of multiple timestamps indicating respective values of the monotonically increasing time source associated with generating respective snapshots of the set of multiple snapshots. The expiration component 835 may be configured as or otherwise support a means for identifying, as part of an expiration job for expiring one or more of the set of multiple snapshots, a reference value of the monotonically increasing time source, the reference value of the monotonically increasing time source based on the retention duration and a current value indicated by the monotonically increasing time source. In some examples, the expiration component 835 may be configured as or otherwise support a means for expiring a snapshot of the set of multiple snapshots based on a timestamp for the snapshot corresponding to a value of the monotonically increasing time source that is less than the reference value of the monotonically increasing time source.

In some examples, the system time component 840 may be configured as or otherwise support a means for synchronizing, by the DMS cluster and based on the reference event, a second time source with a time provided by a network time protocol server or a system clock of the DMS cluster.

In some examples, the system time component 840 may be configured as or otherwise support a means for determining a reference time point of a second time source corresponding to the reference value of the monotonically increasing time source, where expiring the snapshot of the set of multiple snapshots includes determining that the timestamp of the snapshot indicates a time point of the second time source that is less than the reference time point of the second time source.

In some examples, the reference event includes an initialization of the DMS cluster.

In some examples, the monotonically increasing time source indicates a quantity of unit intervals that have elapsed since the reference event, the elapsed time including the quantity of unit intervals.

In some examples, a timeline corresponding to the monotonically increasing time source is partitioned into a set of multiple intervals, and the expiration component 835 may be configured as or otherwise support a means for identifying a set of multiple consecutive intervals of the timeline based on the expiration job, where identifying the set of multiple consecutive intervals includes identifying an ending interval of the set of multiple consecutive intervals that encompasses the current value indicated by the monotonically increasing time source, and identifying a beginning interval of the set of multiple consecutive intervals, where a leading edge of the beginning interval is separated from a trailing edge of the ending interval by a value corresponding to the retention duration, and where the reference value of the monotonically increasing time source is identified based on the leading edge of the beginning interval, the reference value of the monotonically increasing time source corresponding to the leading edge of the beginning interval.

In some examples, the system time component 840 may be configured as or otherwise support a means for determining a reference time point of a second time source, the reference time point corresponding to the reference value of the monotonically increasing time source. In some examples, the expiration component 835 may be configured as or otherwise support a means for identifying a reference snapshot based on the reference time point, the reference snapshot including an earliest snapshot of the set of multiple snapshots that was generated within a duration that begins at the reference time point of the second time source.

In some examples, a second timeline corresponding to the second time source is partitioned into a set of multiple intervals, and the expiration component 835 may be configured as or otherwise support a means for identifying a set of multiple consecutive intervals of the second timeline based on the expiration job, where identifying the set of multiple consecutive intervals includes identifying a beginning interval of the set of multiple consecutive intervals that encompasses the reference snapshot, and identifying a set of subsequent intervals of the set of multiple consecutive intervals, the set of subsequent intervals including an ending interval that encompasses a current time point of the second time source.

In some examples, the expiration component 835 may be configured as or otherwise support a means for identifying respective sets of snapshots in each interval of the set of multiple consecutive intervals. In some examples, the expiration component 835 may be configured as or otherwise support a means for consolidating, in each interval of the set of multiple consecutive intervals, the respective sets of snapshots into respective single snapshots.

In some examples, a second duration of the set of multiple consecutive intervals is greater than the retention duration.

In some examples, the second duration of the set of multiple consecutive intervals is greater than the retention duration based on a time jump of the second time source.

In some examples, the snapshot of the set of multiple snapshots is expired based on the snapshot occurring prior to the reference snapshot on the second time source.

In some examples, expiring the snapshot of the set of multiple snapshots includes deleting the snapshot, consolidating the snapshot and the reference snapshot, or both.

In some examples, the expiration component 835 may be configured as or otherwise support a means for initiating the expiration job based on generating the set of multiple snapshots, where the reference value of the monotonically increasing time source is identified based on initiating the expiration job.

Figure 9:
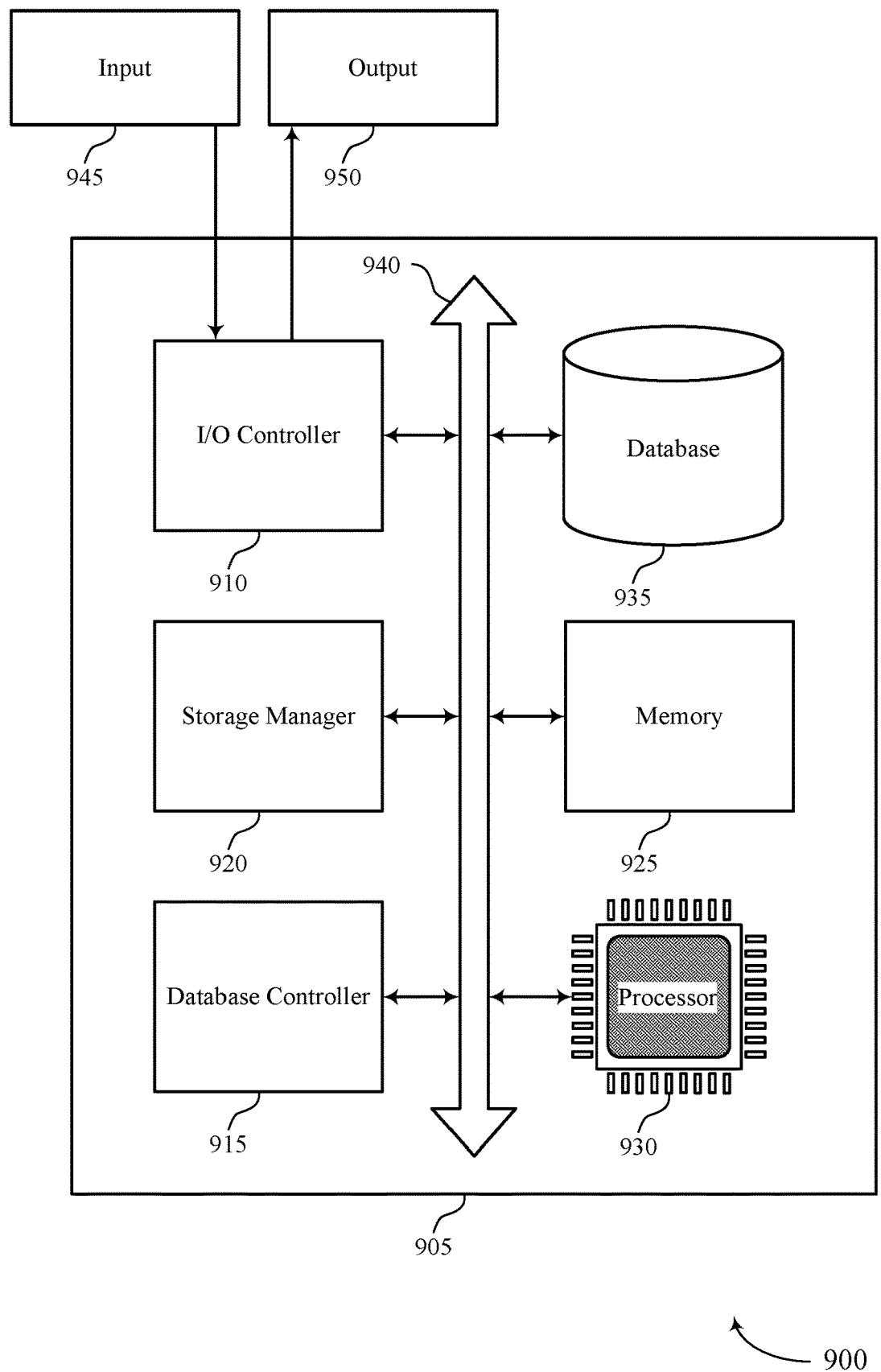
FIG. 9 shows a diagram of a system including a device that supports time variation protection for snapshots in accordance with examples disclosed herein.

FIG. 9 shows a diagram of a system 900 including a device 905 that supports time variation protection for snapshots in accordance with examples disclosed herein. The device 905 may be an example of or include the components of a device 705 as described herein. The device 905 may include components for bi-directional data communications including components for transmitting and receiving communications, such as a storage manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting time variation protection for snapshots).

For example, the storage manager 920 may be configured as or otherwise support a means for activating a monotonically increasing time source that indicates an elapsed time since a reference event. The storage manager 920 may be configured as or otherwise support a means for generating a set of multiple snapshots of a computing object in accordance with a schedule for backing up the computing object, the schedule including a retention duration for retaining snapshots of the set of multiple snapshots. The storage manager 920 may be configured as or otherwise support a means for storing a set of multiple timestamps for the set of multiple snapshots, the set of multiple timestamps indicating respective values of the monotonically increasing time source associated with generating respective snapshots of the set of multiple snapshots. The storage manager 920 may be configured as or otherwise support a means for identifying, as part of an expiration job for expiring one or more of the set of multiple snapshots, a reference value of the monotonically increasing time source, the reference value of the monotonically increasing time source based on the retention duration and a current value indicated by the monotonically increasing time source. The storage manager 920 may be configured as or otherwise support a means for expiring a snapshot of the set of multiple snapshots based on a timestamp for the snapshot corresponding to a value of the monotonically increasing time source that is less than the reference value of the monotonically increasing time source.

Figure 10:
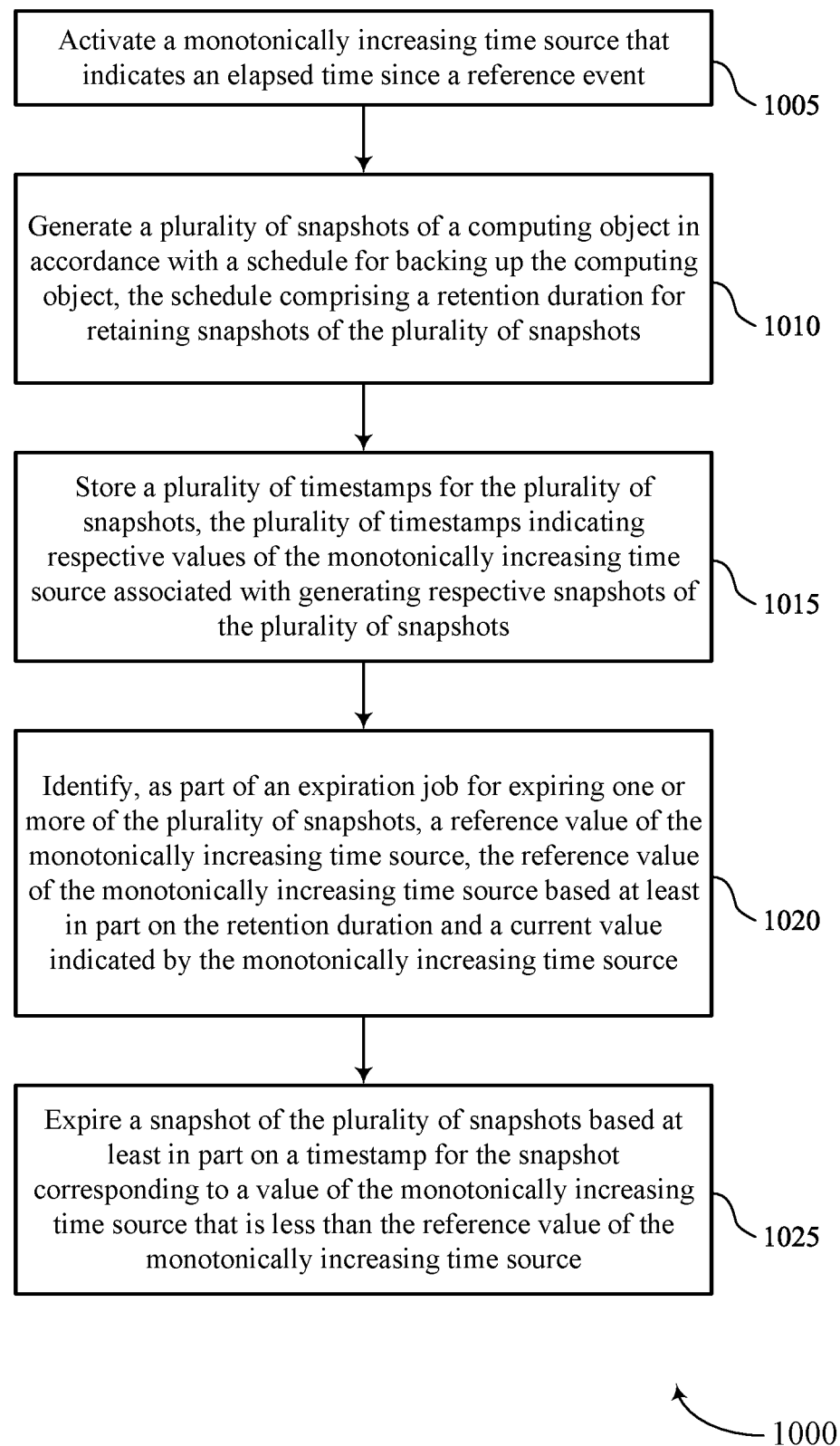
FIG. 10 shows an example of a set of operations for time variation protection for snapshots in accordance with examples disclosed herein.

FIG. 10 shows an example of a set of operations for time variation protection for snapshots in accordance with examples disclosed herein. The operations of the method 1000 may be implemented by a storage appliance or its components as described herein. For example, the operations of the method 1000 may be performed by a storage appliance as described with reference to FIGS. 1 through 9. In some examples, a storage appliance may execute a set of instructions to control the functional elements of the storage appliance to perform the described functions. Additionally, or alternatively, the storage appliance may perform aspects of the described functions using special-purpose hardware.

At 1005, the method may include activating a monotonically increasing time source that indicates an elapsed time since a reference event. The operations of 1005 may be performed in accordance with examples as disclosed herein. In some examples, aspects of the operations of 1005 may be performed by a monotonic time component 825 as described with reference to FIG. 8.

At 1010, the method may include generating a set of multiple snapshots of a computing object in accordance with a schedule for backing up the computing object, the schedule including a retention duration for retaining snapshots of the set of multiple snapshots. The operations of 1010 may be performed in accordance with examples as disclosed herein. In some examples, aspects of the operations of 1010 may be performed by a snapshot component 830 as described with reference to FIG. 8.

At 1015, the method may include storing a set of multiple timestamps for the set of multiple snapshots, the set of multiple timestamps indicating respective values of the monotonically increasing time source associated with generating respective snapshots of the set of multiple snapshots. The operations of 1015 may be performed in accordance with examples as disclosed herein. In some examples, aspects of the operations of 1015 may be performed by a snapshot component 830 as described with reference to FIG. 8.

At 1020, the method may include identifying, as part of an expiration job for expiring one or more of the set of multiple snapshots, a reference value of the monotonically increasing time source, the reference value of the monotonically increasing time source based on the retention duration and a current value indicated by the monotonically increasing time source. The operations of 1020 may be performed in accordance with examples as disclosed herein. In some examples, aspects of the operations of 1020 may be performed by an expiration component 835 as described with reference to FIG. 8.

At 1025, the method may include expiring a snapshot of the set of multiple snapshots based on a timestamp for the snapshot corresponding to a value of the monotonically increasing time source that is less than the reference value of the monotonically increasing time source. The operations of 1025 may be performed in accordance with examples as disclosed herein. In some examples, aspects of the operations of 1025 may be performed by an expiration component 835 as described with reference to FIG. 8.

A method is described. The method may include activating a monotonically increasing time source that indicates an elapsed time since a reference event, generating a set of multiple snapshots of a computing object in accordance with a schedule for backing up the computing object, the schedule including a retention duration for retaining snapshots of the set of multiple snapshots, storing a set of multiple timestamps for the set of multiple snapshots, the set of multiple timestamps indicating respective values of the monotonically increasing time source associated with generating respective snapshots of the set of multiple snapshots, identifying, as part of an expiration job for expiring one or more of the set of multiple snapshots, a reference value of the monotonically increasing time source, the reference value of the monotonically increasing time source based on the retention duration and a current value indicated by the monotonically increasing time source, and expiring a snapshot of the set of multiple snapshots based on a timestamp for the snapshot corresponding to a value of the monotonically increasing time source that is less than the reference value of the monotonically increasing time source.

An apparatus is described. The apparatus may include at least one processor, memory coupled with the processor, and instructions stored in the memory. The instructions may be executable by the at least one processor to cause the apparatus to activate a monotonically increasing time source that indicates an elapsed time since a reference event, generate a set of multiple snapshots of a computing object in accordance with a schedule for backing up the computing object, the schedule including a retention duration for retaining snapshots of the set of multiple snapshots, store a set of multiple timestamps for the set of multiple snapshots, the set of multiple timestamps indicating respective values of the monotonically increasing time source associated with generating respective snapshots of the set of multiple snapshots, identify, as part of an expiration job for expiring one or more of the set of multiple snapshots, a reference value of the monotonically increasing time source, the reference value of the monotonically increasing time source based on the retention duration and a current value indicated by the monotonically increasing time source, and expire a snapshot of the set of multiple snapshots based on a timestamp for the snapshot corresponding to a value of the monotonically increasing time source that is less than the reference value of the monotonically increasing time source.

Another apparatus is described. The apparatus may include means for activating a monotonically increasing time source that indicates an elapsed time since a reference event, means for generating a set of multiple snapshots of a computing object in accordance with a schedule for backing up the computing object, the schedule including a retention duration for retaining snapshots of the set of multiple snapshots, means for storing a set of multiple timestamps for the set of multiple snapshots, the set of multiple timestamps indicating respective values of the monotonically increasing time source associated with generating respective snapshots of the set of multiple snapshots, means for identifying, as part of an expiration job for expiring one or more of the set of multiple snapshots, a reference value of the monotonically increasing time source, the reference value of the monotonically increasing time source based on the retention duration and a current value indicated by the monotonically increasing time source, and means for expiring a snapshot of the set of multiple snapshots based on a timestamp for the snapshot corresponding to a value of the monotonically increasing time source that is less than the reference value of the monotonically increasing time source.

A non-transitory computer-readable medium storing code is described. The code may include instructions executable by at least one processor to activate a monotonically increasing time source that indicates an elapsed time since a reference event, generate a set of multiple snapshots of a computing object in accordance with a schedule for backing up the computing object, the schedule including a retention duration for retaining snapshots of the set of multiple snapshots, store a set of multiple timestamps for the set of multiple snapshots, the set of multiple timestamps indicating respective values of the monotonically increasing time source associated with generating respective snapshots of the set of multiple snapshots, identify, as part of an expiration job for expiring one or more of the set of multiple snapshots, a reference value of the monotonically increasing time source, the reference value of the monotonically increasing time source based on the retention duration and a current value indicated by the monotonically increasing time source, and expire a snapshot of the set of multiple snapshots based on a timestamp for the snapshot corresponding to a value of the monotonically increasing time source that is less than the reference value of the monotonically increasing time source.

Some examples of the method, apparatuses, and non-transitory computer-readable medium described herein may further include operations, features, means, or instructions for synchronizing, by the DMS cluster and based on the reference event, a second time source with a time provided by a network time protocol server or a system clock of the DMS cluster.

Some examples of the method, apparatuses, and non-transitory computer-readable medium described herein may further include operations, features, means, or instructions for determining a reference time point of a second time source corresponding to the reference value of the monotonically increasing time source, where operations, features, means, or instructions for expiring the snapshot of the set of multiple snapshots include operations, features, means, or instructions for determining that the timestamp of the snapshot indicates a time point of the second time source that may be less than the reference time point of the second time source.

In some examples of the method, apparatuses, and non-transitory computer-readable medium described herein, the reference event includes an initialization of the DMS cluster.

In some examples of the method, apparatuses, and non-transitory computer-readable medium described herein, the monotonically increasing time source indicates a quantity of unit intervals that may have elapsed since the reference event, the elapsed time including the quantity of unit intervals.

In some examples of the method, apparatuses, and non-transitory computer-readable medium described herein, a timeline corresponding to the monotonically increasing time source may be partitioned into a set of multiple intervals, and the method, apparatuses, and non-transitory computer-readable medium may include further operations, features, means, or instructions for identifying a set of multiple consecutive intervals of the timeline based on the expiration job, where operations, features, means, or instructions for identifying the set of multiple consecutive intervals include operations, features, means, or instructions for identifying an ending interval of the set of multiple consecutive intervals that encompasses the current value indicated by the monotonically increasing time source, and identifying a beginning interval of the set of multiple consecutive intervals, where a leading edge of the beginning interval may be separated from a trailing edge of the ending interval by a value corresponding to the retention duration, and where the reference value of the monotonically increasing time source may be identified based on the leading edge of the beginning interval, the reference value of the monotonically increasing time source corresponding to the leading edge of the beginning interval.

Some examples of the method, apparatuses, and non-transitory computer-readable medium described herein may further include operations, features, means, or instructions for determining a reference time point of a second time source, the reference time point corresponding to the reference value of the monotonically increasing time source and identifying a reference snapshot based on the reference time point, the reference snapshot including an earliest snapshot of the set of multiple snapshots that was generated within a duration that begins at the reference time point of the second time source.

In some examples of the method, apparatuses, and non-transitory computer-readable medium described herein, a second timeline corresponding to the second time source may be partitioned into a set of multiple intervals, and the method, apparatuses, and non-transitory computer-readable medium may include further operations, features, means, or instructions for identifying a set of multiple consecutive intervals of the second timeline based on the expiration job, where operations, features, means, or instructions for identifying the set of multiple consecutive intervals include operations, features, means, or instructions for identifying a beginning interval of the set of multiple consecutive intervals that encompasses the reference snapshot, and identifying a set of subsequent intervals of the set of multiple consecutive intervals, the set of subsequent intervals including an ending interval that encompasses a current time point of the second time source.

Some examples of the method, apparatuses, and non-transitory computer-readable medium described herein may further include operations, features, means, or instructions for identifying respective sets of snapshots in each interval of the set of multiple consecutive intervals and consolidating, in each interval of the set of multiple consecutive intervals, the respective sets of snapshots into respective single snapshots.

In some examples of the method, apparatuses, and non-transitory computer-readable medium described herein, a second duration of the set of multiple consecutive intervals may be greater than the retention duration.

In some examples of the method, apparatuses, and non-transitory computer-readable medium described herein, the second duration of the set of multiple consecutive intervals may be greater than the retention duration based on a time jump of the second time source.

In some examples of the method, apparatuses, and non-transitory computer-readable medium described herein, the snapshot of the set of multiple snapshots may be expired based on the snapshot occurring prior to the reference snapshot on the second time source.

In some examples of the method, apparatuses, and non-transitory computer-readable medium described herein, operations, features, means, or instructions for expiring the snapshot of the set of multiple snapshots include operations, features, means, or instructions for deleting the snapshot, consolidating the snapshot and the reference snapshot, or both.

Some examples of the method, apparatuses, and non-transitory computer-readable medium described herein may further include operations, features, means, or instructions for initiating the expiration job based on generating the set of multiple snapshots, where the reference value of the monotonically increasing time source may be identified based on initiating the expiration job.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
generating a plurality of snapshots of a computing object, wherein the plurality of snapshots is associated with a plurality of values of a monotonically increasing time source, the plurality of values indicating, relative to a reference event, respective times at which the plurality of snapshots were generated; and
expiring a snapshot of the plurality of snapshots based at least in part on a value of the plurality of values that corresponds to the snapshot being less than a reference value that is based at least in part on a duration for retaining snapshots of the computing object and a current value indicated by the monotonically increasing time source.

2. The method of claim 1, wherein the current value of the monotonically increasing time source indicates an elapsed time since the reference event.

3. The method of claim 1, wherein the plurality of snapshots of the computing object are generated in accordance with a configuration for backing up the computing object, the configuration indicating the duration for retaining snapshots of the computing object.

4. The method of claim 1, further comprising:
storing respective timestamps for respective snapshots of the plurality of snapshots based at least in part on respective values of the plurality of values of the monotonically increasing time source associated with the respective snapshots.

5. The method of claim 1, further comprising:
identifying the reference value based at least in part on a difference between the current value indicated by the monotonically increasing time source and a value of the monotonically increasing time source corresponding to the duration for retaining snapshots.

6. The method of claim 1, further comprising:
synchronizing, based at least in part on the reference event, a second time source with a time provided by a network time protocol server or a system clock of a data management system cluster.

7. The method of claim 1, further comprising:
determining a reference time point of a second time source corresponding to the reference value, wherein the snapshot of the plurality of snapshots is expired based at least in part on a timestamp of the snapshot indicating a time point of the second time source that is less than the reference time point of the second time source.

8. The method of claim 1, wherein the reference event comprises an initialization of a data management system cluster.

9. The method of claim 1, wherein the monotonically increasing time source indicates a quantity of unit intervals that have elapsed since the reference event, and wherein an elapsed time since the reference event comprises the quantity of unit intervals.

10. The method of claim 1, further comprising:
identifying a plurality of consecutive intervals of a timeline corresponding to the monotonically increasing time source, wherein expiring the snapshot is based at least in part on the plurality of consecutive intervals.

11. The method of claim 1, further comprising:
identifying an ending interval of a plurality of consecutive intervals of a timeline corresponding to the monotonically increasing time source, the ending interval encompassing the current value indicated by the monotonically increasing time source, and
identifying a beginning interval of the plurality of consecutive intervals, wherein a leading edge of the beginning interval is separated from a trailing edge of the ending interval by a value corresponding to the duration for retaining snapshots.

12. The method of claim 11, wherein the reference value corresponds to the leading edge of the beginning interval.

13. The method of claim 1, further comprising:
determining a reference time point of a second time source, the reference time point corresponding to the reference value; and
identifying a reference snapshot based at least in part on the reference time point, the reference snapshot comprising an earliest snapshot of the plurality of snapshots that was generated within a duration that begins at the reference time point of the second time source.

14. The method of claim 1, further comprising:
initiating a job for expiring snapshots based at least in part on generating the plurality of snapshots; and
identifying the reference value based at least in part on initiating the job for expiring snapshots.

15. An apparatus, comprising:
one or more memories storing instructions; and
one or more processors coupled with the one or more memories and configured to execute, individually or collectively, the instructions to cause the apparatus to:
generate a plurality of snapshots of a computing object, wherein the plurality of snapshots is associated with a plurality of values of a monotonically increasing time source, the plurality of values indicating, relative to a reference event, respective times at which the plurality of snapshots were generated; and
expire a snapshot of the plurality of snapshots based at least in part on a value of the plurality of values that corresponds to the snapshot being less than a reference value that is based at least in part on a duration for retaining snapshots of the computing object and a current value indicated by the monotonically increasing time source.

16. The apparatus of claim 15, wherein the one or more processors are further configured to execute, individually or collectively, the instructions to cause the apparatus to:
store respective timestamps for respective snapshots of the plurality of snapshots based at least in part on respective values of the plurality of values of the monotonically increasing time source associated with the respective snapshots.

17. The apparatus of claim 15, wherein the one or more processors are further configured to execute, individually or collectively, the instructions to cause the apparatus to:
identify the reference value based at least in part on a difference between the current value indicated by the monotonically increasing time source and a value of the monotonically increasing time source corresponding to the duration for retaining snapshots.

18. A non-transitory, computer-readable medium storing code that comprises instructions that are executable, individually or collectively, by one or more processors to:
generate a plurality of snapshots of a computing object, wherein the plurality of snapshots is associated with a plurality of values of a monotonically increasing time source, the plurality of values indicating, relative to a reference event, respective times at which the plurality of snapshots were generated; and
expire a snapshot of the plurality of snapshots based at least in part on a value of the plurality of values that corresponds to the snapshot being less than a reference value that is based at least in part on a duration for retaining snapshots of the computing object and a current value indicated by the monotonically increasing time source.

19. The non-transitory, computer-readable medium of claim 18, wherein the instructions are further executable, individually or collectively, by the one or more processors to:
store respective timestamps for respective snapshots of the plurality of snapshots based at least in part on respective values of the plurality of values of the monotonically increasing time source associated with the respective snapshots.

20. The non-transitory, computer-readable medium of claim 18, wherein the instructions are further executable, individually or collectively, by the one or more processors to:
identify the reference value based at least in part on a difference between the current value indicated by the monotonically increasing time source and a value of the monotonically increasing time source corresponding to the duration for retaining snapshots.

* * * * *